United States Patent
Aloush

(10) Patent No.: US 8,681,613 B2
(45) Date of Patent: Mar. 25, 2014

(54) METHOD FOR ESTABLISHING AND TERMINATING SERVICE FLOW VIA RELAY NODES USING TUNNEL MECHANISM

(75) Inventor: Avner Aloush, Netanya (IL)

(73) Assignee: iLeverage Group LLC, San Francisco, CA (US)

(*) Notice: Subject to any disclaimer, the term of this patent is extended or adjusted under 35 U.S.C. 154(b) by 465 days.

(21) Appl. No.: 13/049,630

(22) Filed: Mar. 16, 2011

(65) Prior Publication Data

US 2012/0236714 A1    Sep. 20, 2012

(51) Int. Cl.
*H04J 1/16*        (2006.01)
*H04L 1/00*        (2006.01)
*H04L 12/26*    (2006.01)

(52) U.S. Cl.
USPC .......................................................... 370/230

(58) Field of Classification Search
USPC .......................................................... 370/230
See application file for complete search history.

(56) References Cited

PUBLICATIONS

International Telecommunication Union, ITU-T G.9961 Unified high-speed wire-line based home networking transceivers—Data link layer specification, Jun. 2010, pp. 1-211.*

* cited by examiner

*Primary Examiner* — Jung Park
*Assistant Examiner* — Albert Shih
(74) *Attorney, Agent, or Firm* — Kilpatrick Townsend & Stockton LLP; Kenneth R. Allen

(57) ABSTRACT

A mechanism and protocol are provided in a digital communication system having a plurality of nodes in a shared media domain in order to establish a tunneled service flow between an originating node and a hidden endpoint node via at least one relay node by using a tunnel mechanism to enforce the service flow requirement for Quality Of Service required parameters wherein a domain master determines service flow via relay nodes between the originating node and the hidden endpoint node, calculates needed bandwidth resources and reserves the needed bandwidth resources in order to later allocate them to support the service flows required by Quality of Service parameters embodying the tunneled service flow. Procedures are also provided for termination of a tunneled service flow by an application entity or by the originating node or by the domain master.

9 Claims, 10 Drawing Sheets

Second case: the relay node is off, the domain master does not receive confirmation from the disconnected relay node

METHOD FOR ESTABLISHING AND TERMINATING SERVICE FLOW VIA RELAY NODES USING TUNNEL MECHANISM

BACKGROUND OF THE INVENTION

This invention relates to digital telecommunication employing links among at least three nodes. More particularly, the invention relates to service flow establishment over a relayed connection.

In a digital communication environment, in order for two peer nodes to establish communication between each other in a form that complies with certain Quality of Service parameters, for example bits per seconds and max latency, a service flow must be established. A service flow is a transport service that provides unidirectional or bidirectional transport of packets from one node to another in the telecommunication environment. A service flow is associated with Quality of Service parameters for the packets that are transmitted via the connection. When the two peer nodes are hidden from one another, it is impossible to establish a service flow directly between the two peer nodes and so there is a need for one or more relay nodes along a route between the two peer nodes, with service flows to be established between each two nodes along the route. Tunneled service flow comprises a set of service flows that are established between two hidden peer nodes via relay nodes to implement one logical service flow between the two hidden peer nodes. For example a tunneled service flow between peer node-A to peer node-B via relay nodes R1, R2 and R3 comprise a service flow from node-A to relay node R1, a service flow from relay node R2 to relay node R3 and a service flow from relay node R3 to peer node-B. The service flows that implement the tunneled service flow must comply with the Quality of Service parameters of the tunneled service flow. A route is defined as a list of identification numbers, each number associated with a node, defining the order by which nodes are connected to each other starting with a first peer node, ending with a second peer node and including relay nodes intermediating between the first and the second peer nodes. As explained hereinafter this invention provides a mechanism for establishing a tunneled service flow between two hidden peer nodes, i.e., service flows that are established between two hidden peer nodes via a route of relay nodes to implement one logical service flow between the two hidden peer nodes, particularly in a shared media environment.

Prior mechanisms for establishing service flows include those described in the standard promulgated as IEEE P1901. This standard defines high speed (>200 Mbps at the physical layer) communication devices via alternating current electric power lines, so called Broadband over 8 Power Line (BPL) devices. In this standard it is proposed the problem be solved in the following way:

Connections between two nodes that cannot communicate directly are set up by successively establishing a connection for each link in the route between the nodes. Referring to FIG. 5, a tunnel is requested by the initiating node by transmitting a CM_MH_CONN_NEW.request frame 1 to the first node in the route toward the original destination node ("Ultimate Destination") via a series of intermediate nodes, starting with node R1. If accepted at R1, it and each successive node R2 in the route transmits a CM_MH_CONN_NEW.request frame 2, 3 to the next node in the route until the original destination node ("Ultimate Destination") is reached. Each of these management messages contain a Connection ID (CID) chosen by the transmitter for the individual hop, as well as a Multi-hop CID chosen by the original source node that remains constant over all hops.

If the connection is accepted by the original destination node, the original destination node responds with a CM_M-H_CONN_NEW.confirm frame 4 with the result code set to success to the node that sent the CM_MH_CONN_NEW.request frame. If the connection is rejected by any node along the route, such as node R2, then the node (R2) is set to respond with a CM_MH_CONN_NEW.confirm frame 3, but with the result code set to indicate the reason for the failure to the node that sent the CM_MH_CONN_NEW.request frame. In this case, there is no contact with the original destination.

Upon receiving a CM_MH_CONN_NEW.confirm frame, a STA along the route is set to transmit a CM_MH_CONN_NEW.confirm frame with the result code set to the same value received in the CM_MH_CONN_NEW.confirm frame to the STA that originally sent the CM_MH_CONN_NEW.request frame (frames 7 and 10 in FIG. 5). Thus, success or failure is propagated back towards the originating node. If global link IDs are not requested, then the path is set up once the originating node has received its confirmation. If the initiating message indicates that global links are desired, then each STA that receives a CM_MH_CONN_NEW.confirm frame with the result code set to success is set to transmit a CC_MH_LINK_NEW.request frame to the Domain Master DM (frames 5, 8, and 11 in FIG. 5), containing the CID and the MH_CID. If the Domain Master DM grants the Link, the Domain Master DM is set to transmit a CC_MH_LINK_NEW.confirm frame providing the GL identifiers (GLIDs) to each STA on the Link (frames 6, 9a, 9b, 12, 13a, and 13b in FIG. 5). The relay node does not send the CM_MH_CONN_NEW.confirm frame with the result code set to "success" to its predecessor in the path until it receives a success confirmation from the Domain Master DM. The Domain Master DM does not associate the individual GLIDs for each hop together using the MH_CID and OSTEI that is the same for all requests for the Multi-hop Connection being established. The Domain Master DM also does not transmit the CC_MH_LINK_NEW.confirm frame to the original source station nor to the original destination station until all of the Links in the route have been successfully established. Once the CC_MH_LINK_NEW.confirm frame is received from the Domain Master DM, the original source station and the original destination node may begin using the Connection.

If the Domain Master DM cannot set up all of the Links in the route due to insufficient bandwidth for example, then the Domain Master DM is set to transmit the CC_M-H_LINK_NEW.confirm frame indicating failure for the requested link (frame 9a in FIG. 5) to the requesting node and the CC_LINK_REL.indication frame to all nodes with existing Links (known from the OSTEI and MH_CID, frame 9b in FIG. 5), and the node receiving the CC_MH_LINK_NEW.confirm frame indicating failure propagates a CC_MH_CONN_NEW.confirm frame indicating failure to its predecessor (frame 10 in FIG. 5). The DM need not transmit any frame to any node that has not yet received notice of global link establishment. These nodes will each receive a CM_M-H_CONN_NEW.confirm frame indicating failure from their successor in the attempted connection path. The last node adjacent to the original destination is set to send it a CM_CONN_REL.indication frame. If a link is terminated for any reason, then the Domain Master DM is set to send the CC_LINK_REL.indication frame to both nodes on each link in the route indicating the Connection has failed (frame 9b in FIG. 6).

The prior solution to the method of tunnel establishment proposed in IEEE P1901 standard as described above is not efficient. The method for tunnel establishment as specified in IEEE P1901 is started by the originating node that establishes a connection to the first relay hop. Each relay node in the path towards the ultimate destination node establishes a connection to the next node. After all the connections are established in every hop along the path until the ultimate destination node, the last relay node in the path requests bandwidth resources from the domain master for its hop. If in the end of the process the Domain Master DM does not confirm the tunnel establishment, the whole protocol process has been executed for nothing, since all the participant nodes in the tunnel should be informed that they must delete the established service flows and all the involved nodes should release the allocated resources.

SUMMARY OF THE INVENTION

According to the invention, a mechanism and protocol are provided in a digital communication system having a plurality of nodes in a shared media domain in order to establish a tunneled service flow between an originating node and a hidden endpoint node via at least one relay node by using a tunnel mechanism to enforce the service flow requirement for Quality Of Service required parameters wherein a domain master determines the service flow between the originating node and the hidden endpoint node, calculates needed bandwidth resources and reserves the needed bandwidth resources in order to later allocate them to support the service flows required by Quality of Service parameters that embody the tunneled service flow. Procedures are also provided for termination of a tunneled service flow by an application entity or by the originating node or by the domain master due to normal session termination or lack of resources to continue support of the tunneled service or due to broken link in the tunneled service.

In specific operation, the domain master defines the route for the originating node needing to establish a service flow with a hidden endpoint node as a tunnel mechanism, where the tunnel consists on chain of flows between the originating node and the endpoint node via the relay nodes. In the process, the domain master calculates a path from the originating node to the ultimate addressed hidden endpoint node, calculates the needed bandwidth resources and reserves the needed bandwidth resources along the route from the originating node towards the endpoint nodes via the intermediate relay nodes. The domain master may accept or reject the tunneled service flow admission request, subject for example to calculated needed bandwidth resources exceeding the available bandwidth resources. The domain master updates the reserved bandwidth according to changes in the actual PHY rate on each of the hops along the tunnel.

The tunneled service flow mechanism supports an end-to-end route between two peer nodes to service a flow with given Quality of Service requirements. Further, by setting the domain master to determine the route, reserve the needed bandwidth resources, and allocate the resources required for each relay node along the route, the tunneled service flow mechanism guarantees the required Quality of Service (QoS) for the flow.

Contrary to the prior art method, in the inventive method the tunnel establishment starts with the originating node that send an admission request to the domain master to calculate the route to the endpoint node, to verify the viability of such a tunnel, and if so, to reserve bandwidth resources for the entire tunnel (for all the intermediate connections) providing the QoS requirements. The domain master calculates the route from the originating node toward the ultimate addressed node taking into account the QoS requirements and the current physical bit rate in each link in each hop taking into account the demands for bandwidth resources by other services flows of other nodes which are sharing the media.

After the domain master confirms that the required bandwidth resources are available and reserved for the tunnel only then the tunnel establishment procedure is actually started according to the list of relay nodes that is specified by the domain master as result of the optimize path calculation.

The invention will be better understood by reference to the following detailed description and accompanying drawings.

DETAILED DESCRIPTION OF THE INVENTION

Figure 1:
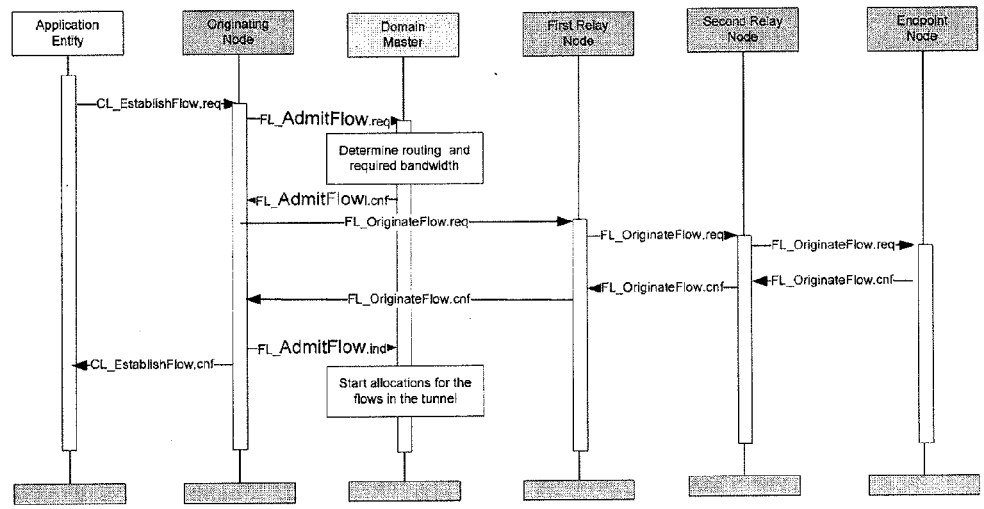
FIG. 1 is a schematic diagram of a message sequence for a successful tunnel establishment in a digital telecommunication system comprising nodes including a domain master.

This invention is intended for application in a shared media environment. Shared media is understood to mean wired physical media such as twisted pair wiring, coaxial cable, power lines and the like, that shares its total available bandwidth with more than one service, including for example frequency division and time division multiplexed audio, video, data and telecommunication services, d.c. power, and control, or any combinations of services according to shared or separate protocols. FIG. 1 illustrates the Message Sequence Chart (MSC) example of a successful tunnel establishment that includes three hops with two relays nodes and three flows in a digital communication system. In the example shown, the originating node sends an admission request to establish the tunnel with given traffic specifications and endpoint node. The domain master figures and determines the routing from the originating node towards the endpoint node and determines the relay nodes along the route. The domain master assesses whether there is enough available bandwidth resources to support all the flows that compose the tunnel, given the traffic specification and the line data rate for each service flow in each hop in the tunnel. The domain master reserves the needed bandwidth resources and confirms the originating node and the tunnel admission, and it allocates the bandwidth. Components of the domain master determine the route based for example on visibility connectivity topology data and the bit rate of each node along the route and allocate the bandwidth resources according to the current bit rate of each node along the route. The admission confirmation message includes the relay route toward the endpoint. The originating node starts the tunnel establishment by creating the flow for the first hop with the first relay node that is specified in the relay nodes along the routing path. The originating node creates the flow by sending an originate request to the next relay node. The originating flow request message includes the routing path until the endpoint plus the required traffic specifications. Each relay node that can support the established flow in its hop continues to establish the service flow towards the next relay node and sends the request to the next relay node until the endpoint. The endpoint node replies with confirmation (positive or negative) to the relay node. Each relay node that receives the confirmation propagates the confirmation back to the originating node. After the originating node receives the confirmation it signals the domain master to start the tunnel allocation to take affect.

Figure 2:
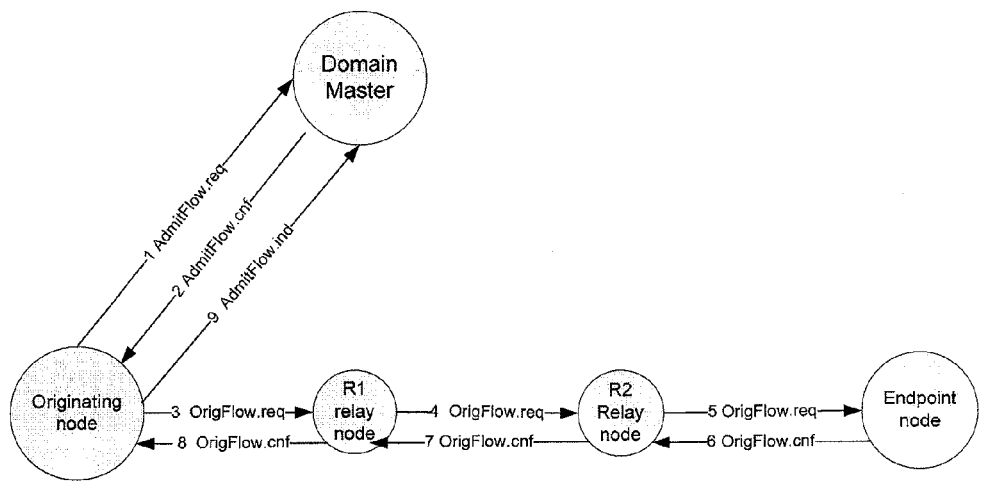
FIG. 2 is a diagram of a successful tunnel establishment.
Figure 3:
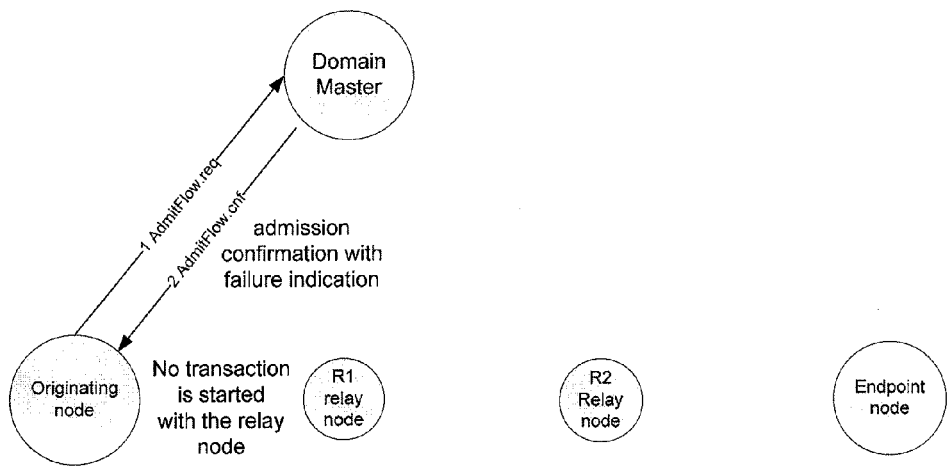
FIG. 3 is a diagram of a tunnel establishment failure scenario on grounds of rejection by the domain master rejecting the admission request for lack of bandwidth.

FIG. 2 illustrates a successful tunnel establishment, while FIG. 3 illustrates a tunnel establishment failure scenario due to the Domain Master rejecting the admission request due to insufficient bandwidth resources. In such a case the originating node should not start any transaction with the relay node to establish the flow and abort the tunnel establishment.

Figure 4:
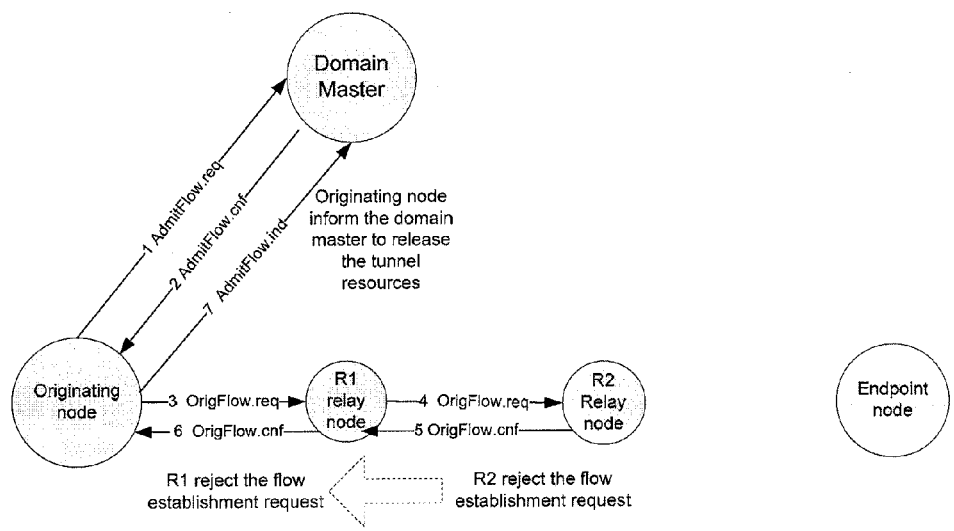
FIG. 4 is a diagram of tunnel establishment failure in the case where a relay node rejects the originate flow request due to limited capabilities.
Figure 5:
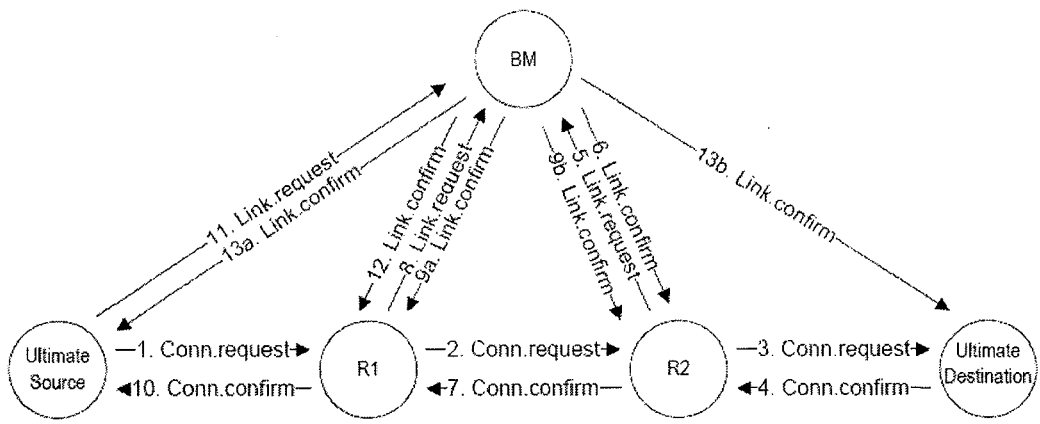
FIG. 5 is a diagram of a prior art successful multi-hop connection setup.
Figure 6:
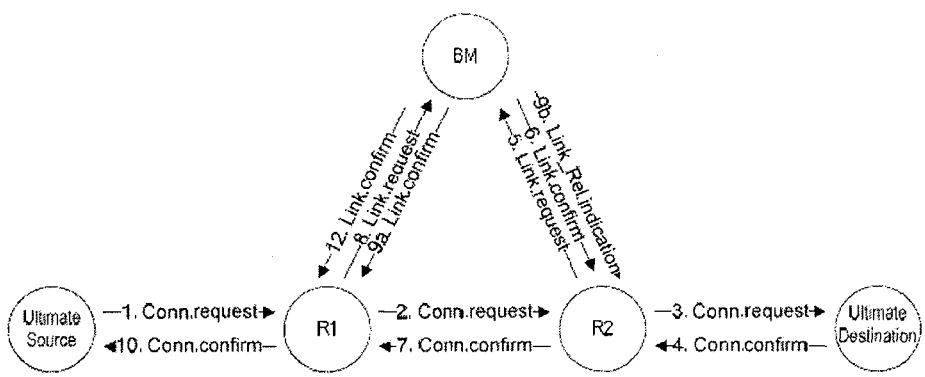
FIG. 6 is a diagram of a prior art unsuccessful multi-hop connection setup.

FIG. 4 illustrate an example of a tunnel establishment failure in the case where the second relay node R2 rejects the originate flow request and it sends to the previous node (R1) a confirmation with a failure code. Thus relay node R1 sends a rejection message to the originating node. The originating node sends failure indication to the domain master to release the reserved bandwidth resources and aborts the tunnel establishment process.

The following description is based upon a traffic Specification and includes descriptions directed to those of ordinary skill in the relevant art. Flow establishment via a relay node or nodes includes the same first steps as in the prior art without relay nodes. However, if the originating node determines that the designated endpoint node is hidden, the originating node initiates the tunnel establishment procedure that includes steps a. through i. as follows:

a. The originating node allocates a FLOW_ID that uniquely identifies the flow and the tunnel using the tuple (DEVICE_ID, FLOW_ID) where DEVICE_ID is the originating node DEVICE ID, the FLOW_ID is defined by the originating node.

If the originating node cannot support the flow establishment, it aborts the tunnel establishment procedure. The abort procedure includes: notifying the higher layer by sending the message CL_EstablishFlow.cnf with failure code and releasing the allocated resources (allocated FLOW_ID, etc).

b. The originating node sends FL_AdmitFlow.req message to the domain master to reserve bandwidth resources for the flow. The message includes the tunnel identification, the designated endpoint and the Traffic Specifications for the requested service flow. The domain master determines the route from the originating node to the designated endpoint node, determining the relay nodes along the route. The domain master assesses whether there is enough available bandwidth resources to support all the flows that compose the tunnel, given the traffic specification and the line data rate for each flow of each hop in the tunnel.

If the domain master can support the tunnel,
   i. The domain master confirms the established tunnel flow by sending the FL_AdmitFlow.cnf message with success code. The FL_AdmitFlow.cnf message includes a list with the relay nodes in the route toward the designated endpoint.
   ii. The domain master reserves the needed bandwidth resources for the identified tunnel: [SID, FLOW_ID, TUNNEL], where SID is the originating node DEVICE ID, the FLOW_ID is the flow specification as defined by the originating node and TUNNEL is the indication that this flow is served via tunnel.
   iii. The domain master reserves the resources for period of time that is enough to complete the tunnel establishment. If the tunnel establishment is not completed during this period of time the domain master releases all the reserved resources.
   iv. The domain master updates the QoS parameters according to the determined route, especially the maximum latency parameter, resulting that the original maximum latency is respected along the entire route. Roughly it should be divided by number, of hops and each established service flow along the route should guarantee the updated maximum latency.

Otherwise, If the domain master cannot support the needed tunnel bandwidth resources requirements,
   i. The domain master notifies the originating node by sending the FL_AdmitFlow.cnf message with the failure code; and
   ii. The originating node aborts the flow tunnel establishment procedure and release the allocated FLOW_ID.

c. The originating node gets from the received FL_AdmitFlow.cnf message the next relay node ID toward the designated endpoint and send the FL_OriginateFlow.req message to the next relay node to verify whether the flow can be supported by the next relay node. The FL_OriginateFlow.req message includes the list of the relays nodes toward the designated endpoint node, the addressed endpoint node and the traffic specification (QoS attributes). The originating node updates the QoS parameters according to the specified route, especially the MAX latency (if required). The MAX latency is to be divided according to number of hops, so that the aggregation of all the delays in each hop does not exceed the original required maximum latency.

d. If the relay node that receives the FL_OriginateFlow.req message can support the requested flow establishment,
   It allocates a FLOW_ID that uniquely identifies the flow toward the next node and the tunnel using the tuple (Original node DEVICE_ID, FLOW_ID). It binds the previous FLOW_ID with the next flow FLOW_ID that it has just allocated. It gets from the FL_OriginateFlow.req message the next relay node and sets to the FL_OriginateFlow.req message the new allocated FLOW_ID and sends it to the next relay node.
   Otherwise, if the relay node cannot support the new flow establishment then it replies to the node that sent the FL_OriginateFlow.req message by sending FL_OriginateFlow.cnf message with failure code and abort the flow tunnel establishment procedure.

e. The next relay node that receives FL_OriginateFlow.req executes step (d.). Step (d.) is executed as long as there are still relay nodes along the path toward the designated endpoint. If the relay node in step (d.) has sent the FL_OriginateFlow.req message to the designated endpoint, then the procedure continues to step (f.).

f. The endpoint node that receives the FL_OriginateFlow.req message evaluates its current actual capabilities to support the requested flow establishment:

If the endpoint node cannot support the new flow establishment then it replies by sending the FL_OriginateFlow.cnf message with a failure code and aborts the tunnel establishment process.

Otherwise if the endpoint node can support the new flow establishment then it replies to the relay node that sent it the FL_OriginateFlow.req message by sending the FL_OriginateFlow.cnf message with a success code.

g. The relay node that receives the FL_OriginateFlow.cnf with the success code updates the FL_OriginateFlow.cnf message by adding to the route flows list the flow ID that it has established and sends the FL_OriginateFlow.cnf message as a reply to the node that originally sent it the FL_OriginateFlow.req.

h. Step (g.) is then executed until the FL_OriginateFlow.cnf is received by the originating node.

i. When the originating node receives the FL_OriginateFlow.cnf message with the success code it sends the FL_AdmitFlow.ind message to the domain master to notify that the tunnel establishment has completed successfully. The FL_AdmitFlow.ind includes all the established flow IDs that comprise the tunnel. The originating node sends to the higher application entity the CL_EstablishFlow.cnf message with the success code.

j. After the domain master receives the FL_AdmitFlow.ind it allocate the actual bandwidth resources required to serve the flows that compose the tunnel.

In each one of the steps in case of failure the node that receives the failure indication aborts the establishment process by forwarding the message with the failure code toward the originating node that is responsible for the whole tunnel establishment procedure and release any allocated resource including the allocated FLOW_ID etc. The originating node informs the domain master about the tunnel establishment failure and the domain master then releases the reserved bandwidth resources.

Format of FL_OriginateFlow.req

The FL_OriginateFlow.req message is sent by a node that needs to originate a flow to a selected endpoint. This message contains the TSpec that is used by the originating and endpoint nodes and the FLOW_ID allocated by the originating node. In case the flow is bidirectional, the message contains the TSpec and classifiers for the other flow direction as well. In case the endpoint node is hidden, the tunnel field is set and the endpoint DEVICE ID is included in the message together with the route list. The route list includes the list of relay nodes toward the endpoint. Table 1 illustrates the preferred format for the FL_OriginateFlow request message.

Table 2 illustrates the preferred format for the Route List associated with the message. Each relay node is given a unique device identifier.

TABLE 1

Format of FL_OriginateFlow.req message

| Field | Octet | Bits | Description |
|---|---|---|---|
| DeviceID | 0 | [7:0] | DEVICE_ID of the originating node. |
| FlowID | 1 | [7:0] | FLOW_ID assigned by the originating node. |
| TSpec | 2 – (N + 2) | [8 * (N + 1) – 1:0] | See in Table 8-22. |
| Bidirectional | Variable | [7:0] | When set to 1 it indicates that the flow is bidirectional flow. When set to 0 it indicates that the flow is unidirectional flow. |
| DA_B | Variable | [47:0] | Destination MAC address for the bidirectional other direction established flow. NOTE1. |
| TSpec_B | Variable | Table 8-23 | It contains the TSpec of the other flow direction from the endpoint to the originating node. NOTE1 |
| Classifiers_B | Variable | NOTE2 | Classifiers to classify APDUs to be transmitted via the other flow direction. NOTE1 |
| Tunnel | Variable | [7:0] | 0x00 - direct flow establishment 0x01 - flow via relays establishment |
| EndPoint | Variable | [7:0] | DEVICE_ID of the endpoint hidden node |
| RouteList | Variable | Table 8-28a | Routing list toward the destination endpoint |

NOTE1 - This fields SHALL exist in the message only if Bidirectional field is set to 1.
NOTE2 -The format of the classifiers are for further study.

TABLE 2

Format of RouteList

| Field | Octet | Bits | Description |
|---|---|---|---|
| NumRelays | 0 | [7:0] | Number of relay nodes in the routeList = n |
| RelayNode | 1 | [7:0] | DEVICE_ID of the first relay node in the list. |
| ... | | | (n – 2) Relay nodes entries |
| RelayNode | n – 1 | [7:0] | DEVICE_ID of the last relay node in the list |

Format of FL_OriginateFlow.cnf

The FL OriginateFlow message is sent by the endpoint node to the node that is attempting to originate a new flow. This message, as its format is illustrated in Table 3, contains the status of the attempt to originate the flow and the FLOW_ID previously provided in message FL_OriginateFlow.req that allows the originator and the endpoint to coordinate flow set-up requests. In case the flow is a bidirectional flow, the message contains the FLOW_ID of the other direction assigned by the endpoint node. In case of tunnel flow was requested, then the confirmation contains the list of flow IDs from the endpoint until the originating node.

TABLE 3

Format of FL_OriginateFlow.cnf message

| Field | Octet | Bits | Description |
|---|---|---|---|
| DeviceID | 0 | [7:0] | DEVICE_ID of the originating node. |
| FlowID | 1 | [7:0] | FLOW_ID assigned by the originating node. |

TABLE 3-continued

Format of FL_OriginateFlow.cnf message

| Field | Octet | Bits | Description |
|---|---|---|---|
| StatusCode | 2 | [7:0] | Status of the request to establish a flow:<br>0x00 = Success.<br>0x01 = Failure - Maximum number of flows already started by the endpoint node.<br>0x02 = Failure - Error in TSpec passed in FL_OriginateFlow.req.<br>0x03 = Failure - Insufficient resources<br>0x04 = Failure - maximum number of flows already started by the bidirectional endpoint node.<br>0x05 = Failure - error in TSpec passed in CL_EstablishFlow.req for the bidirectional flow other direction<br>0x06 = Failure - insufficient capacity to support the flow for the bidirectional flow other direction<br>0x07-0xFF = Reserved. |
| Bidirectional | 3 | [7:0] | When set to 1 it indicates that the flow is bidirectional flow.<br>When set to 0 it indicates that the flow is unidirectional flow. |
| Tunnel | 4 | [7:0] | 0x00 - direct flow establishment is confirmed<br>0x01 - tunnel flow establishment is confirmed |
| NumFlowIDs | 5 | [7:0] | Number of flows IDs in the list = n |
| FlowID | 6 | [7:0] | First flow ID in the list. It is the flow ID of the last hop assigned by the last relay node toward the endpoint. |
| ... | ... | ... | [n − 2] flow IDs |
| FlowID | 6 + n − 1 | [7:0] | Last flow ID in the list. It is the flow ID of the first relay note in the route toward the endpoint. |

Format of FL_AdmitFlow.req

FL_AdmitFlow.req message is sent by the originating node to the Domain Master, after the two nodes involved in establishing a new flow have exchanged messages FL_OriginateFlow.req and FL_OriginateFlow.cnf and the endpoint node has agreed to support the new flow. This message, whose format is illustrated by Table 4, contains the TSpec, the actual transmission rate and a FLOW_ID. The actual transmission rate enables the Domain Master to allocate the estimated needed number of symbols to serve the flow transmission according to number of bytes needed to be transmitted and the actual line rate. In case of bidirectional flow the message is set to include the TSpec of the flow in the other direction and its actual line rate. In case the tunnel field is set to 1 then the hidden endpoint is included in the message as well.

TABLE 4

Format of FL_AdmitFlow.req message

| Field | Octet | Bits | Description |
|---|---|---|---|
| DeviceID | 0 | [7:0] | DEVICE_ID of the originating node. |
| FlowID | 1 | [7:0] | FLOW_ID assigned by the originating node. |
| TSpec | variable | Table 8-22 | See in Table 8-22. |
| TX rate | variable | Table 8-23 | The actual line rate used by the transmitter, specified in bits per symbol for each channel estimation window, based on the bit loading per symbol, the symbol time. The FEC rate, the number of repetitions, and the overhead according to the block size.<br>The format of TXRate field is described in Table 8-31.<br>The offset of this field depends on the previous field actual length (TSpec) field.<br>Note that the transmission rate should be specified per each channel estimation window |
| Bidirectional | variable | [7:0] | Set to 1 in case the required established flow shall be bidirectional flow. |
| DeviceID_B | variable | [7:0] | DEVICE_ID of the endpoint node. NOTE 1 |
| FlowID_B | variable | [7:0] | FLOW_ID of the reverse direction of a bidirectional flow that was assigned by the endpoint node. |
| TSpec_B | variable | Table 8-22 | The TSpec of the reverse direction in case that Bidirectional Flow field is set. NOTE 1 |
| TX rate_B | variable | Table 8-31 | The same as TX_rate for the other flow direction in case that Bidirectional field is set. NOTE 1 |
| Tunnel | variable | [7:0] | 0x00 - direct flow admission is requested<br>0x01 - tunnel flow admission is requested |
| EndPoint | variable | [7:0] | DEVICE_ID of the endpoint hidden node. NOTE 2 |

NOTE 1 - field appear only if Bidirectional field is set to one
NOTE 2 - Field included in the message only if Tunnel field contains the value 1.

Format of FL_AdmitFlow.cnf

The FL_AdmitFlow.cnf message, whose format is as illustrated in Table 5, is sent by the Domain Master to the originating node after it has assessed whether a traffic contract can be provided for a new flow (i.e., whether the flow can be supported). This message contains the status of the attempt to admit the new flow and the FLOW_ID. In case of bidirectional flow, the status may include a failure code of the reverse direction flow. In case the FL_AdmitFlow.req contained Tunnel field set to 1, then the FL_AdmitFlow.cnf contains this field set to 1 as well and included list with the relay nodes toward the endpoint hidden node.

TABLE 5

Format of FL_AdmitFlow.cnf message

| Field | Octet | Bits | Description |
|---|---|---|---|
| DeviceID | 0 | [7:0] | DEVICE_ID of the originating node. |
| FlowID | 1 | [7:0] | FLOW_ID assigned by the originating node. |
| StatusCode | 2 | [7:0] | Status of the request to establish a flow:<br>0x00 = Success.<br>0x01 = Failure - maximum number of flows already started by originating node.<br>0x02 = Failure - error in TSpec passed in FL_AdmitFlow.req.<br>0x03 = Failure - insufficient capacity to admit the flow given the TSpec passed in FL_AdmitFlow.req.<br>0x04 = Failure - maximum number of flows already started by the bidirectional endpoint node.<br>0x05 = Failure - error in TSpec passed in FL_AdmitFlow.req for the bidirectional flow other direction<br>0x06 = Failure - insufficient capacity to support the flow for the bidirectional flow other direction<br>0x07-0xFF = Reserved. |
| TSpecRejct | 6-7 | [15:0] | This field has an applicable information only if StatusCode is set to a value that is greater than 2. This field specifies the TSpec attributes that have been rejected by the domain master. This field relates to the originate flow or to the reverse flow in case the reverse direction flow of a bidirectional flow was rejected. The field format is as specified in table 8-24. |
| Bidirectional | 3 | [7:0] | Set to 1 in case the admitted flow is a bidirectional flow. |
| DeviceID_B | 4 | [7:0] | DEVICE_ID of the originating node. NOTE 1 |
| FlowID_B | 5 | [7:0] | FLOW_ID of the reverse direction of a bidirectional flow that was assigned by the endpoint node. NOTE 1 |
| Tunnel | variable | [7:0] | 0x00 - direct flow admission request<br>0x01 - tunnel flow admission request |
| EndPoint | variable | [7:0] | DEVICE_ID of the endpoint hidden node. NOTE 2 |
| RouteList | variable | Table 8-28a | Routing list toward the destination endpoint. NOTE 2 |

NOTE 1 - field appear only if Bidirectional field is set to one.
NOTE 2 - Field included in the message only if Tunnel field contains the value 1.

Format of FL_AdmitFlow.ind

FL_AdmitFlow.ind message, whose format is as illustrated in Table 6, is sent by the originating node to the Domain Master to inform the domain master that the flow tunnel establishment is completed. The message contains the list of established flows from the originating node towards the endpoint node.

TABLE 6

Format of FL_AdmitFlow.ind message

| Field | Octet | Bits | Description |
|---|---|---|---|
| DeviceID | 0 | [7:0] | DEVICE_ID of the originating node. |
| FlowID | 1 | [7:0] | FLOW_ID assigned by the originating node. |
| StatusCode | 2 | [7:0] | Status of the request to establish a flow:<br>0x00 = Success.<br>0x01 = Failure - maximum number of flows exceeded.<br>0x02 = Failure - insufficient capacity to support the flow<br>0x03 - 0xFF = Reserved. |
| Bidirectional | 3 | [7:0] | Set to 1 in case the admitted flow is a bidirectional flow. |
| TSpecRejct | 6-7 | [15:0] | This field has an applicable information only if StatusCode is set to a value that is 2. This field specifies |

TABLE 6-continued

Format of FL_AdmitFlow.ind message

| Field | Octet | Bits | Description |
|---|---|---|---|
| | | | the TSpec attributes that have been rejected by the domain master. This field relates to one of the relay nodes in the route towards the endpoint node. The field format is as specified in table 8-24. |
| EndPoint | variable | [7:0] | DEVICE_ID of the endpoint hidden node. |
| RouteList | variable | Table 8-32c/d NOTE 2 | Routing list toward the destination endpoint. NOTE 1 |

NOTE 1 - in case of failure the routeList shall contain the relay node that fail to establish the flow toward the endpoint.
NOTE 2 - In case that the Bidirectional is set to 1 then the RouteList is defined in Table 8. otherwise it is defined in Table 7

TABLE 7

Format of RouteList

| Field | Octet | Bits | Description |
|---|---|---|---|
| NumRelays | 0 | [7:0] | Number of relay nodes in the routeList = n |
| FlowID | 1 | [7:0] | FLOW_ID Between the originating node and the first relay node. |
| ... | | | (n − 2) FlowID entries of established flows between the relay nodes in the route list. |
| FlowID | n − 1 | [7:0] | FLOW_ID Between the last relay node and the endpoint node. |

TABLE 8

Format of RouteList

| Field | Octet | Bits | Description |
|---|---|---|---|
| NumRelays | 0 | [7:0] | Number of relay nodes in the routeList = n |
| FlowID | 1 | [7:0] | FLOW_ID Between the originating node and the first relay node. |
| FlowID_B | 2 | [7:0] | FLOW_ID Between the first relay node to the originating node as the reverse bidirectional flow. |
| ... | | | (n − 2) FlowID pers of FlowID and reverse FlowID_B entries of established flows between the relay nodes in the route list. |
| FlowID | 2(n − 1) | [7:0] | FLOW_ID Between the last relay node and the endpoint node. |
| FlowID_B | 2(n − 1) + 1 | [7:0] | FLOW_ID Between the endpoint to the last relay node as the reverse bidirectional flow. |

Tunnel Termination Procedures

The following bullets describe various cases for tunnel termination:

The Domain Master may decide to terminate a selected tunnel due to change of channel conditions.

The Domain Master may decided to terminate a selected tunnel because it infers that the route of the selected tunnel is no longer valid due to topology changes. In such a case, it may terminate the current tunnel and trigger the originating node to establish a new tunnel via an alternative route.

The Domain Master may determine that one of the relay nodes associated with a tunnel is disconnected. In this case, the Domain Master then terminates the tunnel and may trigger the originating flow to establish a new tunnel if there is alternate routing path toward the endpoint node.

The originating node or any relay node or the endpoint node may infer that one the involved nodes is disconnected. In such a case the node that infers the disconnected node is set to inform the originating node.

The originating node, the endpoint node, the relay nodes and the Domain Master are to follow the flow signalling protocol when terminating a tunnel. Each one of the nodes that are participating in the tunnel maintenance including the domain master may trigger a tunnel termination. The following subsections define several possible cases of tunnel termination.

Message Sequences for Tunnel Terminated by the Application Entity

Figure 7:
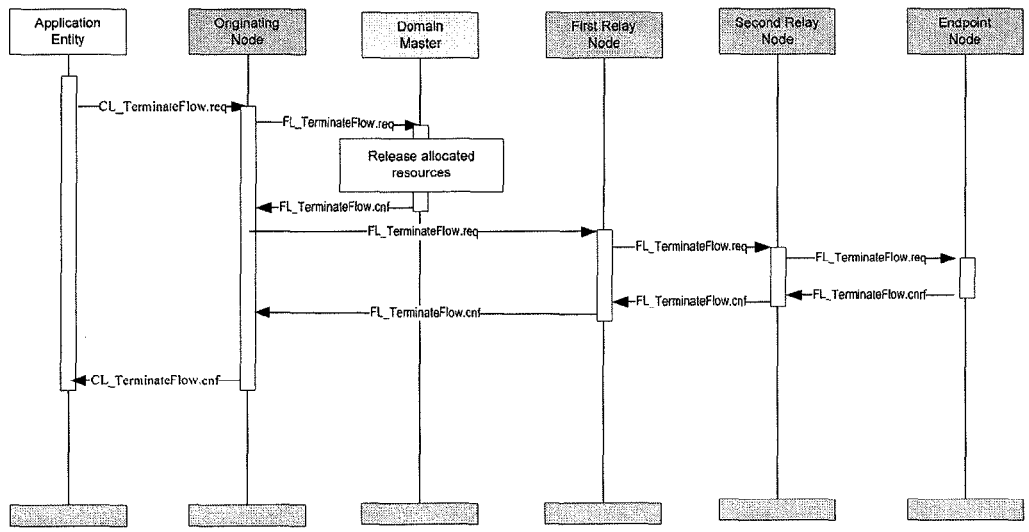
FIG. 7 is a schematic diagram of a message sequence for a successful tunnel termination triggered by an application entity

In the case as shown in FIG. 7, the Application entity informs the originating node to terminate the flow. The originating node sends a FL_TerminateFlow.req to the domain master to inform the domain master that it may stop the bandwidth resources allocations. The originating node orders the adjacent relay node to terminate the tunnel. The relay node continues to forward towards the endpoint the termination order directly or via other relay nodes. When the endpoint node receives the FL_TerminateFlow.req message from the relay node, it frees its own resources that it allocated to support the flow, and sends FL_TerminateFlow.cnf to the relay node. When the relay node receives the FL_TerminateFlow.cnf message from the endpoint node it frees its own resources that it allocated to support the tunnel, and send FL_TerminateFlow.cnf message to the next relay node towards the originating node. When the originating node receives the FL_TerminateFlow.cnf message from the relay node, it frees its own resources that it allocated to support the flow. Finally, the originating node sends CL_FlowTerminated.ind to the application entity running on its associated client.

Message Sequences for Tunnel Terminated by the Originating Node

Figure 8:
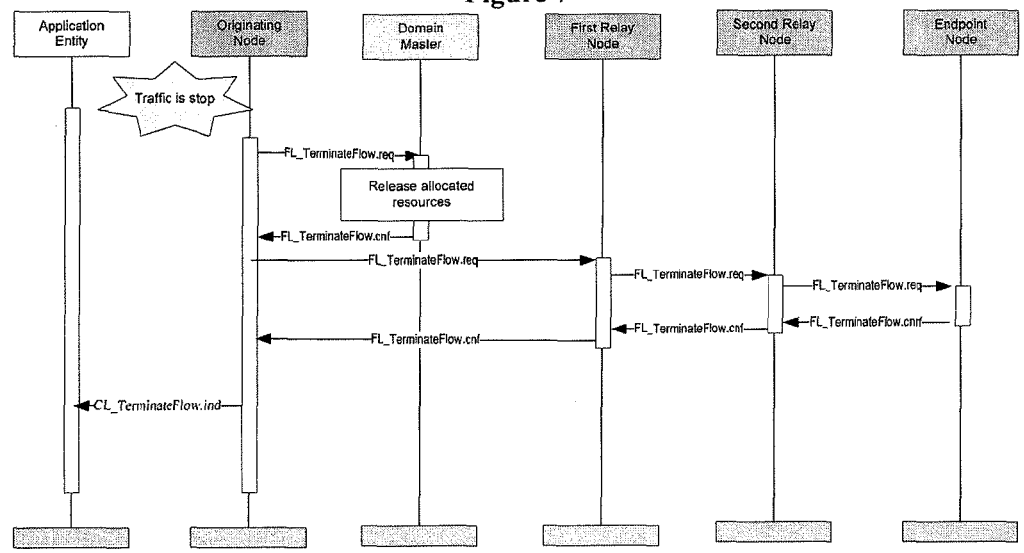
FIG. 8 is a schematic diagram of a message sequence of a case for a successful tunnel termination triggered by the originating node.

Referring to FIG. 8, the originating node has determined that the transmission of data associated with the flow has ended, through inference and not by the reception of message CL_TerminateFlow.req transmitted from the application entity residing on the client. In this case the message sequence is to be the same as in the previous case except for the sending of the CL_TerminationFlow.ind to the application entity. If and only if the application entity is ordered to establish the service flow, then the originating node sends the CL_TerminationFlow.ind message to the application entity.

Tunnel Terminated Triggered by Originating Node Due to Broken Link

Figure 9:
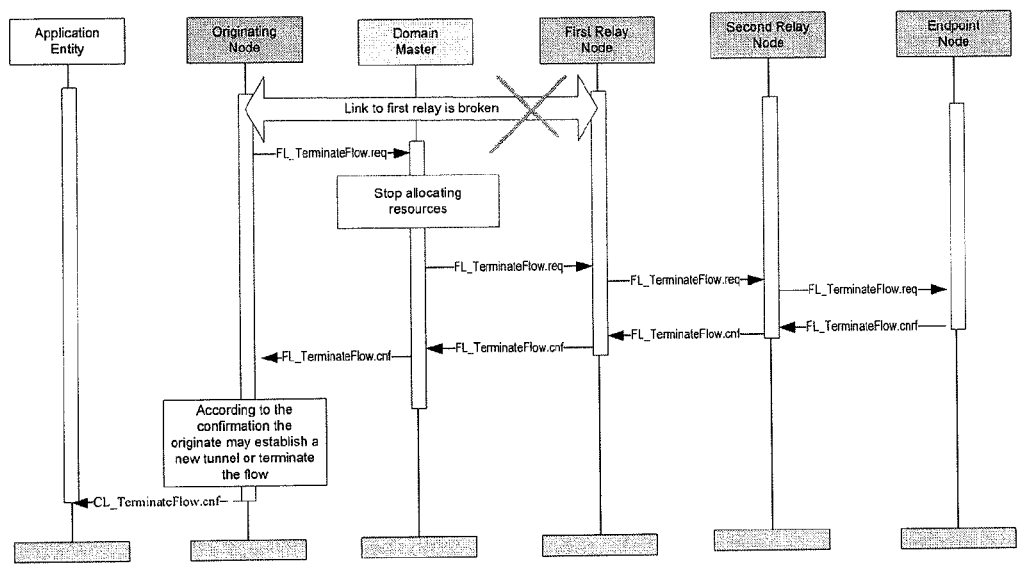
FIG. 9 is a schematic diagram of a message sequence of a further case for a successful tunnel termination triggered by the originating node.

When the originating node determines that the link to its adjacent relay node is broken, the protocol is as shown in FIG. 9. The originating node sends a FL_TerminateFlow.req message to the Domain Master and the Domain Master frees the resources previously committed to the flow. Next, the domain master sends a FL_TerminateFlow.req to the disconnected relay node. If the disconnected relay node receives the FL_TerminateFlow.req message it sends FL_TerminateFlow.req to the next relay node along the tunnel path towards the endpoint node. When the endpoint node receives the FL_TerminateFlow.req message from the relay node, it frees its own resources that it allocated to support the flow, and replies with the FL_TerminateFlow.cnf message to the relay node. When the relay node receives the FL_TerminateFlow.cnf message from the endpoint node it frees its own resources that it allocated to support the tunnel and sends a FL_TerminateFlow.cnf message to the next relay node towards the originating node. When the relay node that receives the FL_TerminateFlow.req message from the domain master receives the FL_TerminateFlow.cnf message, it replies to the domain master with the FL_TerminateFlow.cnf message. Then the domain master inform the originating node that the tunnel is terminated by the FL_TerminateFlow.cnf message. According to the contents of the FL_TerminateFlow.cnf message, the originating node may decide to try to establish a new tunnel or to inform the application entity that the flow is terminated (in case the application entity triggered the flow establishment).

Tunnel Termination Triggered by Originating Node Due to Dead Relay Node

Figure 10:
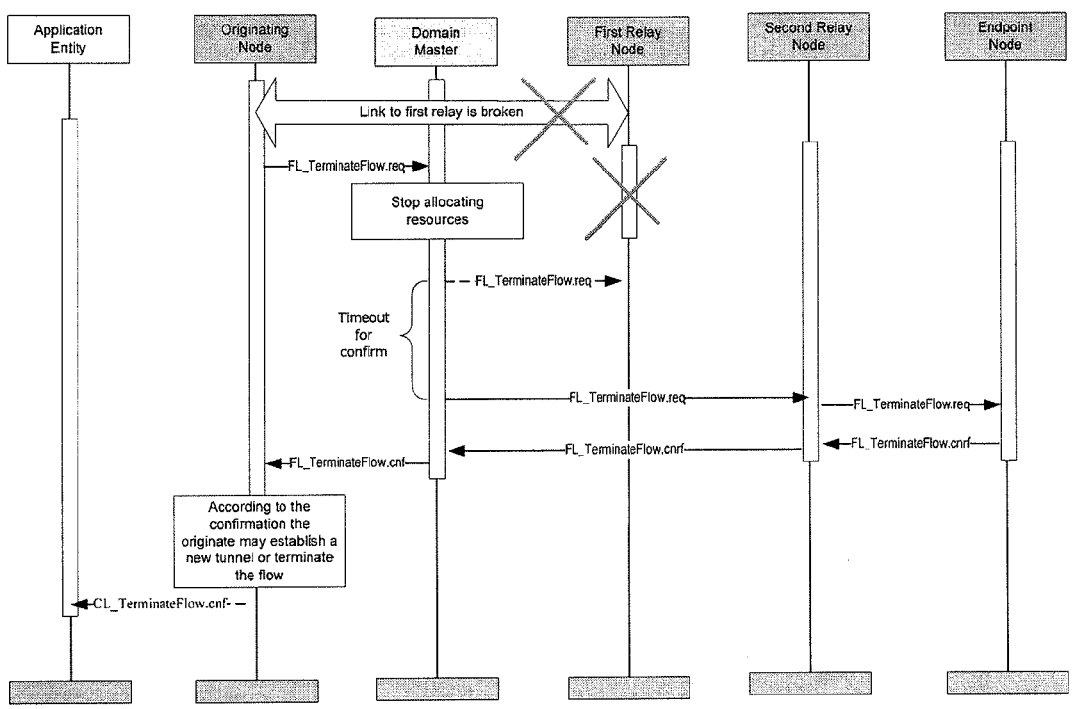
FIG. 10 is a schematic diagram of a message sequence of a further case for a successful tunnel termination triggered by the originating node.

This case starts as previous case but the reason for the broken link is that the relay node is off. In this case, as shown in FIG. 10, the originating node sends a FL_TerminateFlow.req message to the Domain Master and the Domain Master frees the resources previously committed to the flow. Next, the domain master sends the FL_TerminateFlow.req to the disconnected relay node. But since the relay node is off the domain master does not receive the FL_TerminateFlow.cnf message from the disconnected relay node, and when all the retries have expired, it sends a FL_TerminateFlow.req message to the next relay node towards the endpoint node as shown in FIG. 10.

Figure 11:
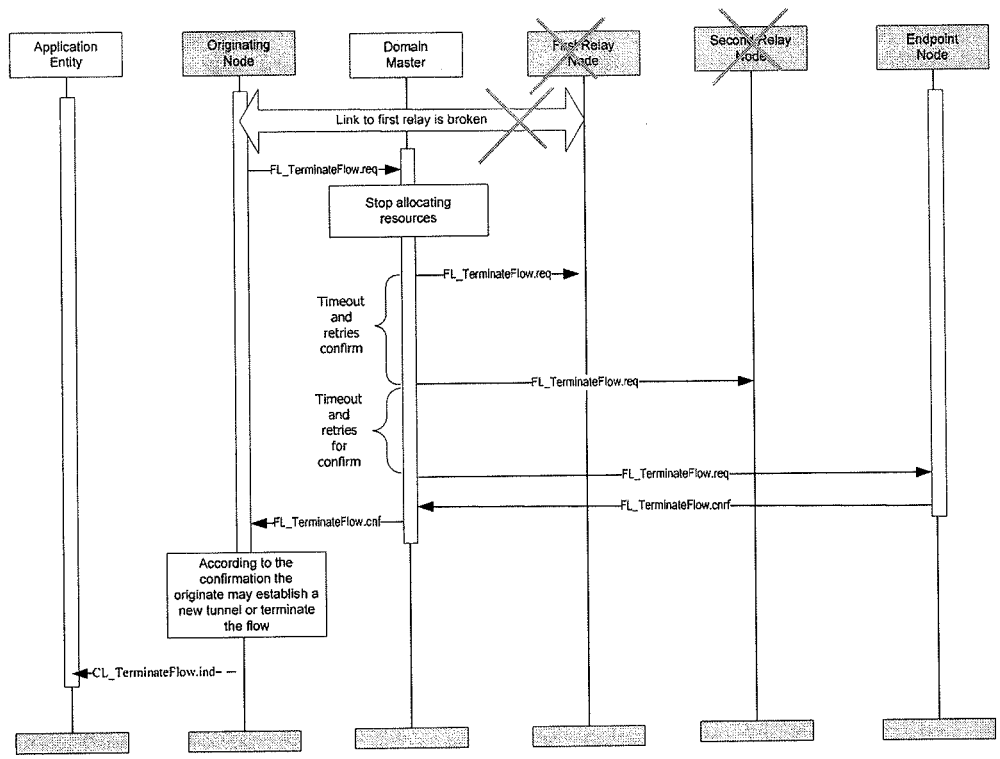
FIG. 11 is a schematic diagram of a message sequence of a further case for a successful tunnel termination triggered by the originating node.

If the next relay node receives the FL_TerminateFlow.req message from the domain master, it sends it on to the endpoint node as shown in FIG. 11. The endpoint, after receiving the FL_TerminateFlow.req message, releases the tunnel resources and confirms its action with the FL_TerminateFlow.cnf to the relay node. Upon receiving the FL_TerminateFlow.cnf message, the relay node sends a FL_TerminateFlow.cnf to the domain master. The domain master send a FL_TerminateFlow.cnf to the originating node informing it about the results of the tunnel termination. The originating node may request a new tunnel establishment from the domain master or it releases all the resources and informs the application entity if that application entity requested the flow establishment originally.

Tunnel Terminated Triggered by Originating Node when Both Relay Nodes are Dead

In the case that the first and the second relay nodes are dead, the domain master does not receive the FL_TerminateFlow.cnf message from the next relay node, so when all the retries have expired, it sends a FL_TerminateFlow.req message to the endpoint node as shown in FIG. 11.

The domain master receives the FL_TerminateFlow.cnf message from the endpoint node as shown in FIG. 11, and it sends a FL_TerminateFlow.cnf message to originating node as shown in FIG. 11. The originating node may request a new tunnel establishment from the domain master or it releases all the resources and informs the application entity if application entity requested the flow establishment originally.

Figure 12:
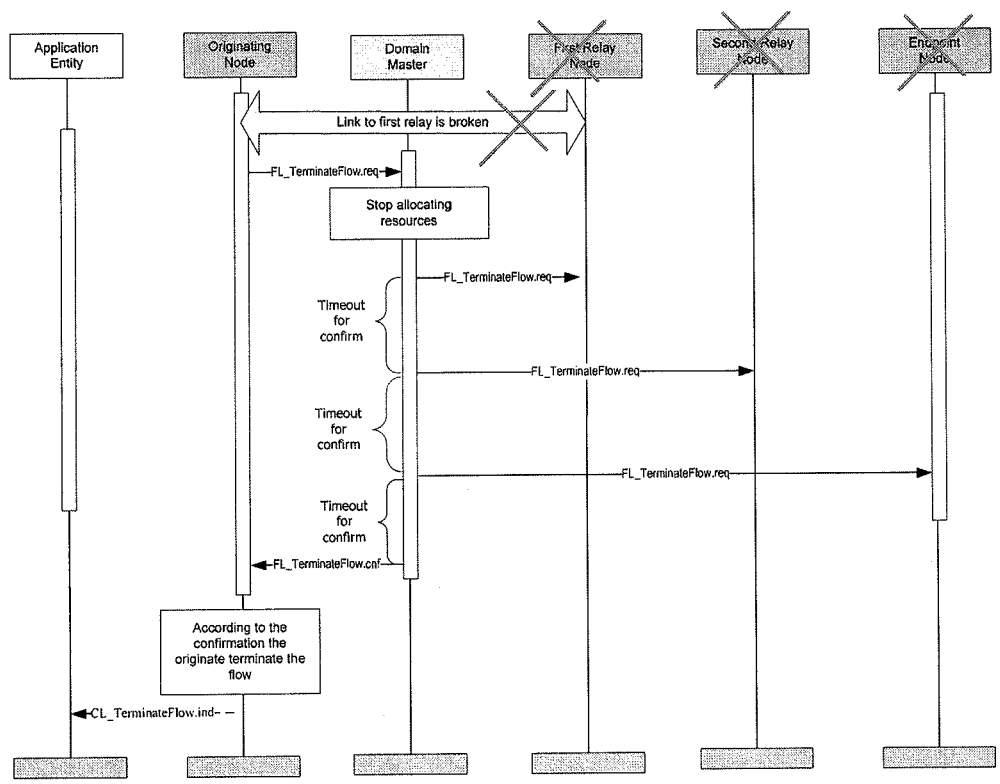
FIG. 12 is a schematic diagram of a message sequence of a further case for a successful tunnel termination triggered by the originating node.

Tunnel Terminated Triggered by Originating Node when Both Relay Nodes and Endpoint Nodes are Dead Following the previous case where the domain master does not receive a reply from both relay nodes and the domain master does not receive a reply FL_TerminateFlow.cnf message from the endpoint node, when all the retries have expired, a FL_TerminateFlow.req message is sent to the originating node as shown in FIG. 12. The originating node release all the resources and informs the application entity (if application entity requested the flow establishment originally).

Tunnel Termination Triggered by a Relay Node

Figure 13:
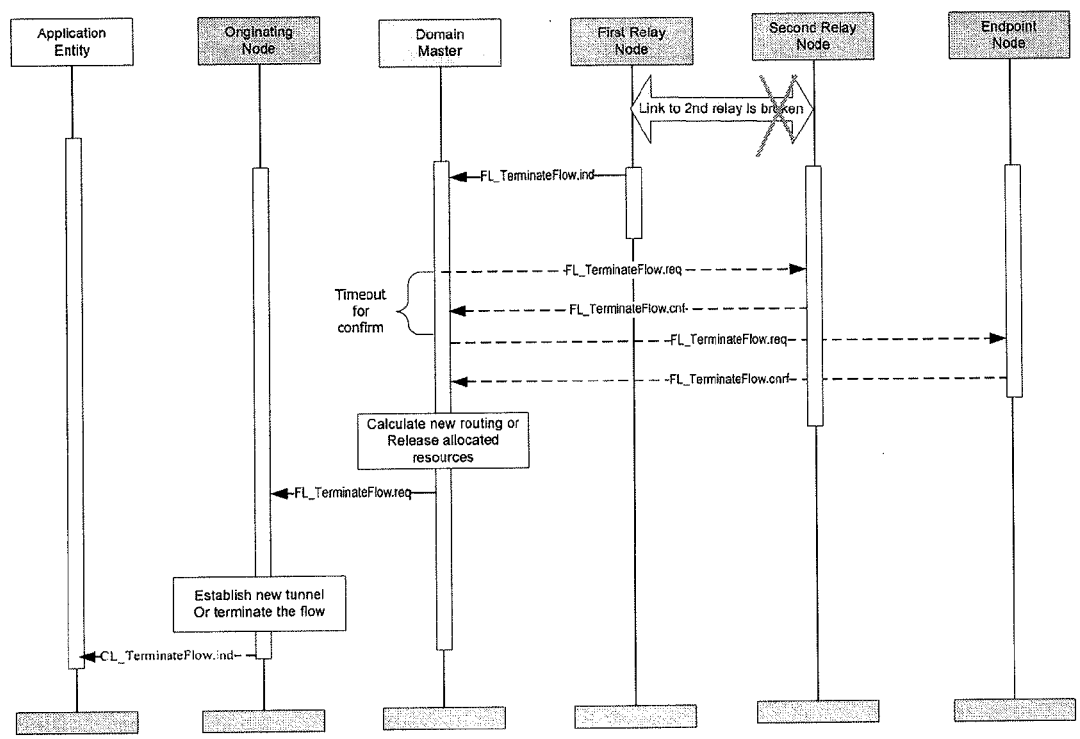
FIG. 13 is a schematic diagram of a message sequence of a case for a successful tunnel termination triggered by a relay node.

When the message sequence protocol that is triggered by a relay node has determined that the link towards the endpoint is broken, as shown in FIG. 13, a FL_TerminateFlow.ind message is sent to the domain master. The domain master sends a FL_TerminateFlow.req message to all the participant nodes in the tunnel. After the domain master has completed the tunnel termination procedure unto the endpoint, it sends a FL_TerminateFlow.req message to the originating node informing it about the status of the endpoint node (whether it is dead or accessible). Based on the specifications in the FL_TerminateFlow.req message, the originating node may try to establish a new link or inform the application entity (if needed) that the flow was terminated.

Message Sequence for Tunnel Terminated by the Endpoint Node

Figure 14:
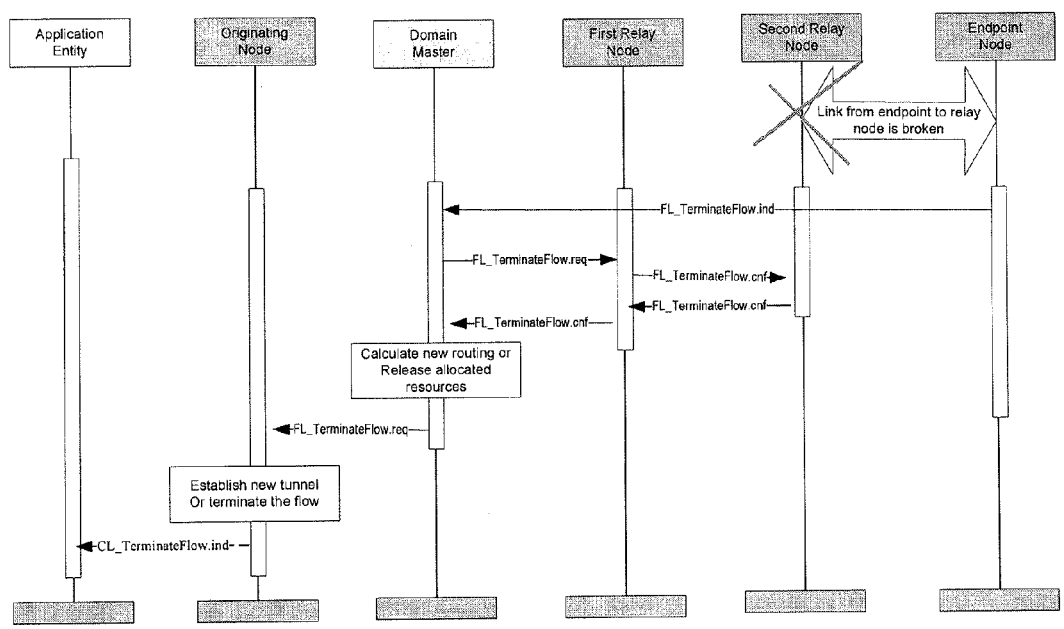
FIG. 14 is a schematic diagram of a message sequence showing how a flow can be terminated.

In the case where the endpoint node initiates the termination, the endpoint node has determined that the link to the relay node is broken (FIG. 14). It then sends a FL_TerminateFlow.ind message to the domain master to inform it about the broken link. The domain master is responsible to release all allocated resources and to terminate the tunnel for all the participating nodes as described in previous sections. After the domain master completes the tunnel termination procedure unto the endpoint, it send a FL_TerminateFlow.req message to the originating node informing it about the status of the endpoint node (dead or accessible). Based on the specifications in the FL_TerminateFlow.req message, the originating node attempts to establish a new link or inform the application entity (if needed) that the flow was terminated.

Format of FL_TerminateFlow.req

The FL_TerminateFlow.req message is sent by the originating node to the endpoint and to the Domain Master when the originating node has determined that the flow should be ended. In the case where the ended flow is a bidirectional flow, the endpoint node also terminates its own flow. This message may also be sent by the Domain Master to the originating node if the flow must be terminated (e.g., this can occur if the channel becomes over-subscribed, or the tunnel is broken). This message contains a reason code for the request plus the flow's identity. In case of a bidirectional flow, when the endpoint node has determined that the flow should be ended, it sends this message to the originating node and to the domain master. In this case, the DeviceID and the FlowID are the DEVICE_ID and FLOW_ID of the endpoint node. The originating node after receiving this message from the endpoint node also terminates its bidirectional flow. In case of tunnel termination and this message is sent by the originating node to the adjacent relay node, the relay node forwards it to the next relay node or endpoint node. The format of the MMPL of the FL_TerminateFlow.req message is shown in Table 9.

TABLE 9

Format of the MMPL of the FL_TerminateFlow.req message

| Field | Octet | Bits | Description |
| --- | --- | --- | --- |
| TerminatorID | 0 | [7:0] | DEVICE_ID of the originating node or of the domain master node that triggers the flow termination |
| DeviceID | 0 | [7:0] | DEVICE_ID of the originating node or of the endpoint node in case of |

TABLE 9-continued

Format of the MMPL of the FL_TerminateFlow.req message

| Field | Octet | Bits | Description |
|---|---|---|---|
| | | | bidirectional flow or relay node in case of a tunnel. |
| FlowID | 1 | [7:0] | FLOW_ID assigned by the originating node or of the endpoint node in case of bidirectional flow or a relay node in case of a tunnel. |
| ReasonCode | 2 | [7:0] | Reason why the flow is being terminated:<br>$00_{16}$ = Normal termination by originating node or by endpoint node in case of bidirectional flow.<br>$01_{16}$ = Termination by Domain Master due to over-subscription of the channel.<br>$02_{16}$ = Termination by Domain Master due to tunnel is broken.<br>$03_{16}$ = Termination by Domain Master due to endpoint is disconnected.<br>$04_{16}$ = Termination by Originating node due to tunnel is broken<br>$05_{16}$-$FF_{16}$ = Reserved. |

Format of FL_TerminateFlow.cnf

The FL_TerminateFlow.cnf message may be sent by the Domain Master or by the endpoint node or by any relay node in a tunnel in response to a received FL_TerminateFlow.req message. This message is sent to the node that transmitted the FL_TerminateFlow.req message. This message contains the flow's identity. In case of bidirectional flow, this message is sent by the originating node in the case where the endpoint node ended the bidirectional flow. In case of a tunnel termination, the result is to specify if the tunnel termination is completed unto the endpoint node. If a relay node receives the FL_TerminateFlow.req from the originating node or domain master node, it replies with the TerminateFlow.cnf message with a success indication after it receives the TerminateFlow.cnf from the next adjacent relay node or endpoint node. If it does not receive the TerminateFlow.cnf from the next adjacent relay node or endpoint node it replies with a fail status. The format of the MMPL of the FL_TerminateFlow.cnf message is shown in Table 10.

TABLE 10

Format of the MMPL of the FL_TerminateFlow.cnf message

| Field | Octet | Bits | Description |
|---|---|---|---|
| DeviceID | 0 | [7:0] | DEVICE_ID of the originating node or of the endpoint node in case of bidirectional flow. |
| FlowID | 1 | [7:0] | FLOW_ID assigned by the originating node or of the endpoint node in case of bidirectional flow. |
| Status | 2 | [7:0] | Status of termination.<br>$00_{16}$ = termination is completed successfully.<br>$01_{16}$ = tunnel termination is fail due to broken link.<br>$05_{16}$-$FF_{16}$ = Reserved. |

Format of FL_TerminateFlow.ind

The FL_TerminateFlow.ind message is sent by a relay node that participates in a tunnel to the domain master when it determines that the next hop link is broken. The format of the MMPL of the FL_TerminateFlow.ind message is as shown in Table 11.

TABLE 11

Format of the MMPL of the FL_TerminateFlow.ind message

| Field | Octet | Bits | Description |
|---|---|---|---|
| RelayID | 0 | [7:0] | DEVICE_ID of the relay node that indicate the broken link in a tunnel. |
| DeviceID | 0 | [7:0] | DEVICE_ID of the originating node or of the endpoint node in case of bidirectional flow or relay node in case of a tunnel. |
| FlowID | 1 | [7:0] | FLOW_ID assigned by the originating node or of the endpoint node in case of bidirectional flow or a relay node in case of a tunnel. |
| ReasonCode | 2 | [7:0] | Reason why the flow is being terminated:<br>$00_{16}$ = Link is broken towards the next hop<br>$01_{16}$-$FF_{16}$ = Reserved. |

The invention has been explained with reference to specific embodiments related to establishment and termination of a tunnel in support of service flow. Other embodiments will be evident to those of ordinary skill in the art. For example, the peer nodes need not be hidden from one another for the invention to function, nor is it always necessary that one or more relay nodes exist. Still further, whereas the invention has been explained in reference to operations at the application layer according to conventional protocol, the invention can be implemented at other layers without departing from the spirit and scope of the invention. The originating node and the domain master need not be the only determinants of the route, or service flow. Other nodes or services may determine route for the service flow. Quality of Service criteria need not be the only reason for admission or denial of service. Other criteria include priority of users, priority of content, size of content, so long as the decision is based on the ability to support the service flow. The reservable resources need not only be bandwidth. For example, memory might be reserved, so long as the only resources allocated by the domain master are bandwidth resources. It is therefore not intended that this invention be limited, except as indicated by the appended claims, which content shall be considered an integral part of the description of the invention and which is incorporated herein for all purposes.

What is claimed is:

1. A method for establishing a tunneled service flow between a first peer node and a second peer node hidden from one another in centralized shared media of a digital telecommunication system comprising:

initiating via the first peer node a request to a domain master for admission to establish the tunneled service flow, with required Quality of Service parameters, between the first peer node and the second peer node, the first peer node and the second peer node being hidden from one another;

upon the domain master determining that the requested tunneled service flow cannot be supported:

providing, by the domain master, a rejection to the request for admission to establish the requested tunneled service flow; and if the domain master determines that the tunneled service flow can be supported:

defining, at the domain master, a single route through one or more relay nodes;

defining, at the domain master, service flow parameters that support the requested tunneled service flow in the centralized shared media;

reserving, at the domain master, resources needed to support the requested tunneled service flow;

providing, by the domain master, an admission to establish the requested tunneled service flow, the admission including the single route;

passing control messages between the first peer node, the one or more relay nodes, and the second peer node to establish the requested tunneled service flow as the tunneled service flow; and after completion of establishment of the tunneled service flow, providing identifications of components of the tunneled service flow to the first peer node;

upon receiving at the domain master a message containing identifications of the tunneled service flow provided by the first peer node, granting, by the domain master, to the first peer node, to the second peer node and to the one or more relay nodes, bandwidth resources that are sufficient to support the tunneled service flow.

2. The method according to claim 1, wherein service flows between the first peer node, the one or more relay nodes and the second peer node embody the tunneled service flow between the first peer node and the second peer node.

3. The method according to claim 1 upon receiving the admission to establish tunneled service flow, determining, by the first peer node, Quality of Service (QoS) parameters for each service flow along the route that embodies the tunneled service flow.

4. The method according to claim 3 wherein the first peer node further determines a maximum latency parameter as a function of the number of relay nodes in the route.

5. The method according to claim 1 upon receiving the admission to establish the tunneled service flow, determining, by the domain master, Quality of Service (QoS) parameters for each service flow along the route that embodies the tunneled service flow.

6. The method according to claim 5 wherein the domain master further determines a maximum latency parameter as a function of the number of relay nodes in the route.

7. The method according to claim 1 wherein the domain master further calculates needed bandwidth resources and guaranties that the needed bandwidth resources are made available to support required Quality of Service parameters at each relay node of the service flow.

8. The method according to claim 7 wherein calculation by the domain master to reserve the needed bandwidth resources is a function of actual line physical bit rate of each link between the nodes, computed available bandwidth resources, required traffic specifications, and the Quality of Service parameters.

9. The method according to claim 1, whereupon disruption of a link or lack of bandwidth resources along the tunneled service flow, issuing at one of the domain master, the first peer node, the second peer node, and the one or more relay nodes, a flow termination indication message respecting the tunneled service flow to a recipient among another one of the domain master, the first peer node, the second peer node, and the one or more relay nodes, to advise of intended cessation of the tunneled service flow;

processing a flow termination request message at the recipient to prompt an action to effect at least one of terminating a current link and ending of allocating of resources; and establishing a further tunneled service flow of an alternative route.

* * * * *